United States Patent [19]
Hedges et al.

[11] Patent Number: 5,640,571
[45] Date of Patent: Jun. 17, 1997

[54] INTERRUPT STEERING FOR A COMPUTER SYSTEM

[75] Inventors: Brian J. Hedges, Hillsboro; Michael W. Scriber, North Plains, both of Oreg.

[73] Assignee: Intel Corporation, Santa Clara, Calif.

[21] Appl. No.: 396,740

[22] Filed: Mar. 1, 1995

[51] Int. Cl.[6] .......................... G06F 9/46; G06F 13/14
[52] U.S. Cl. .................... 395/734; 395/733; 395/735; 395/739; 395/741; 395/800; 395/868; 395/869
[58] Field of Search ................................. 395/733, 734, 395/742, 500, 741, 736, 800, 735, 737, 868, 869

[56] References Cited

U.S. PATENT DOCUMENTS

| | | | |
|---|---|---|---|
| 5,101,497 | 3/1992 | Culley et al. | 395/725 |
| 5,113,390 | 5/1992 | Hayashi et al. | 370/65 |
| 5,261,107 | 11/1993 | Klim et al. | 395/725 |
| 5,287,523 | 2/1994 | Allison et al. | 395/725 |
| 5,381,541 | 1/1995 | Begun et al. | 395/500 |

*Primary Examiner*—Jack B. Harvey
*Assistant Examiner*—Raymond N. Phan
*Attorney, Agent, or Firm*—Blakely, Sokoloff, Taylor & Zafman

[57] ABSTRACT

An interrupt request router is described. The interrupt request router stores a configuration value in a register, receives an interrupt request signal of a first plurality of interrupt request signals, and generates an interrupt request signal of a second plurality of interrupt request signals. The interrupt request signal of a second plurality of interrupt request signals is determined by the configuration value.

19 Claims, 9 Drawing Sheets

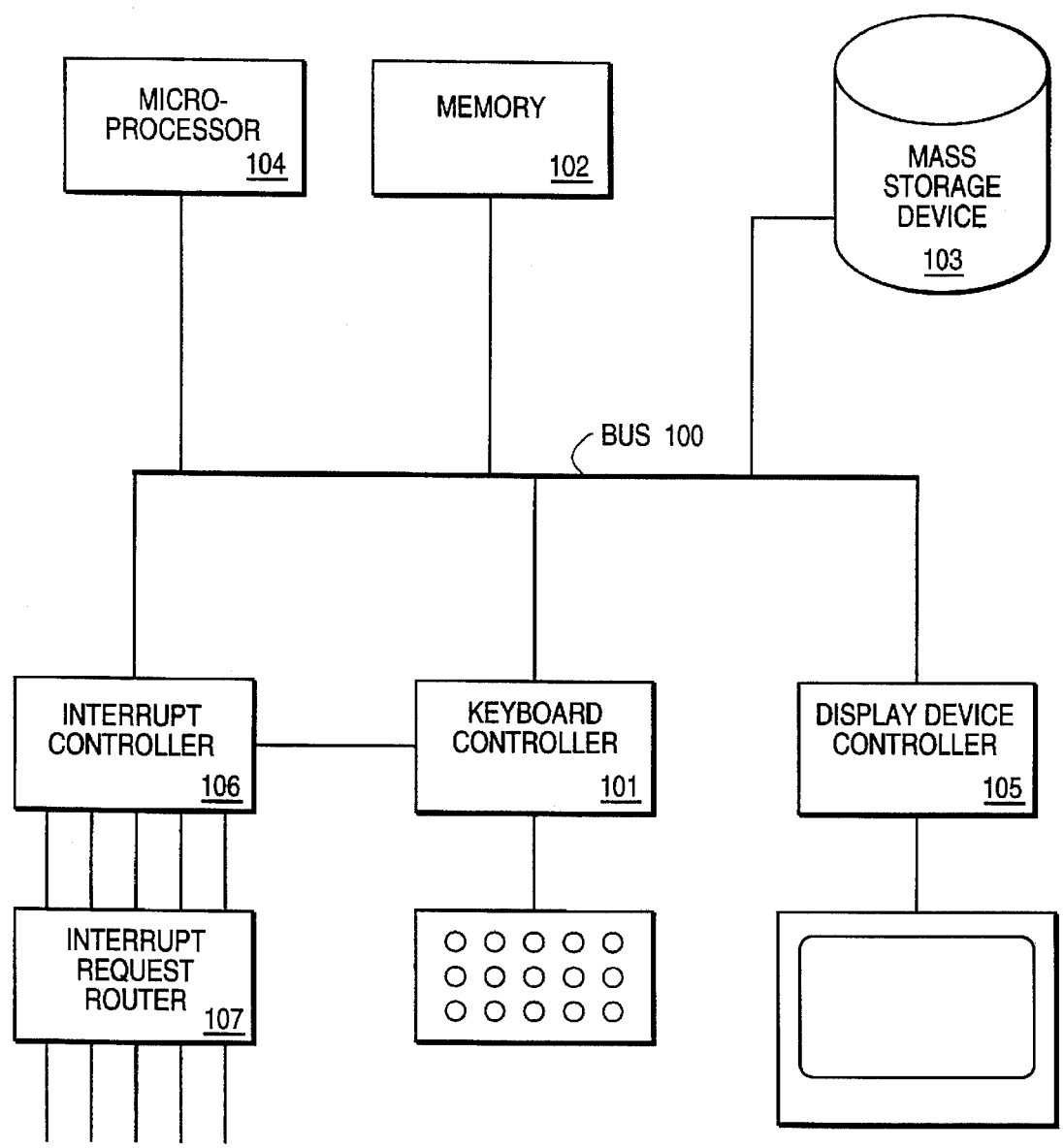
FIG_1

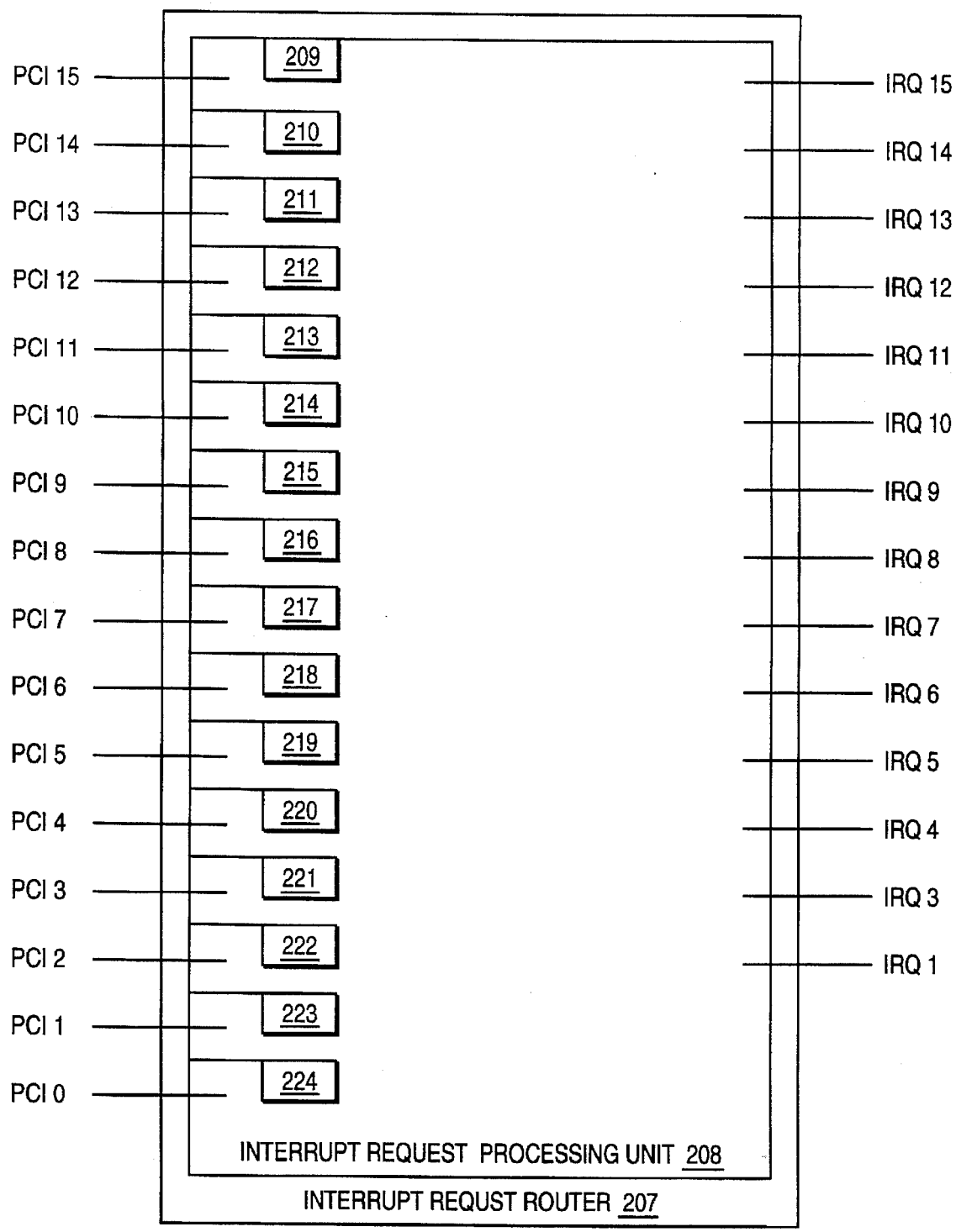
FIG_2

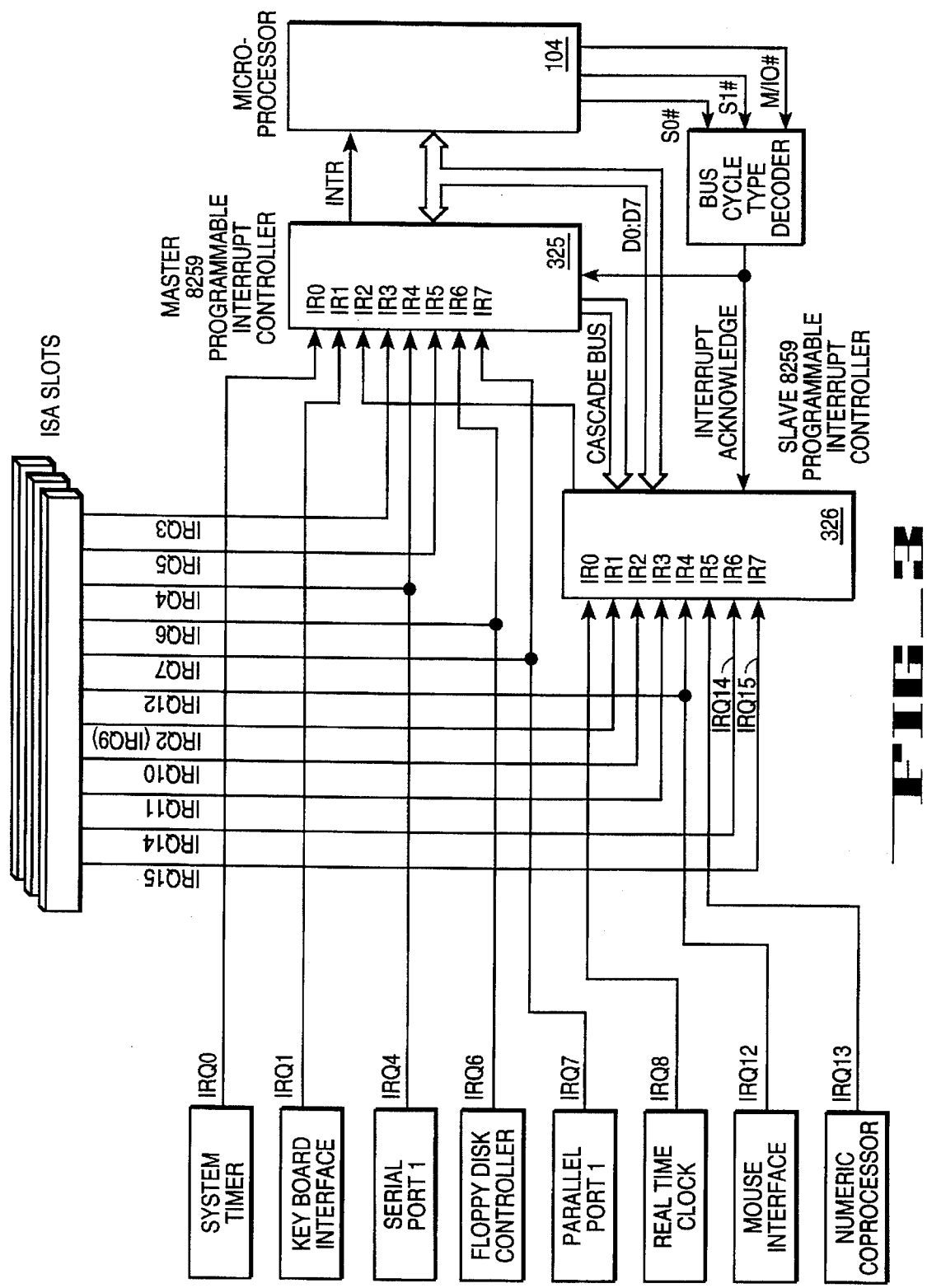

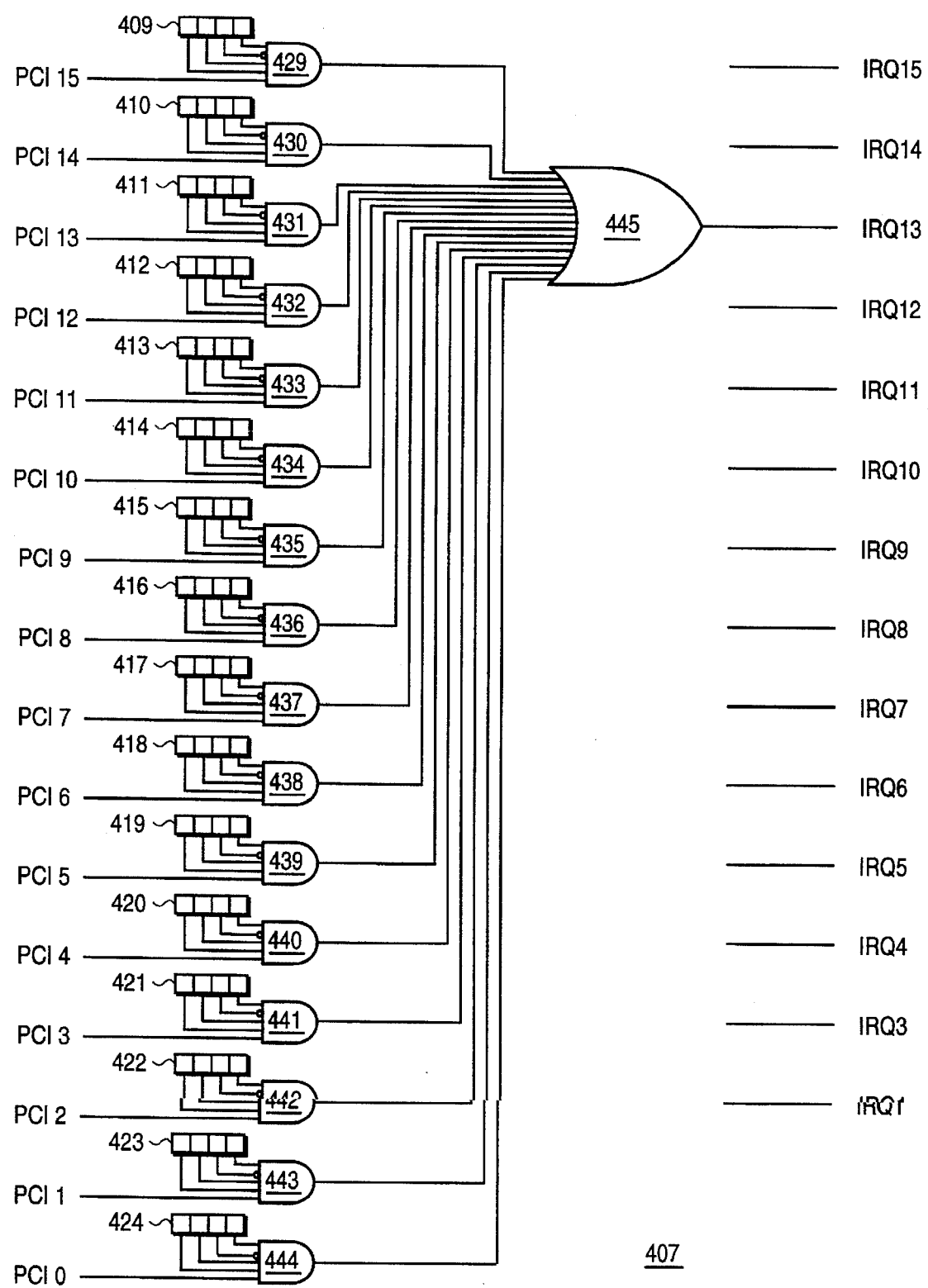
FIG_4

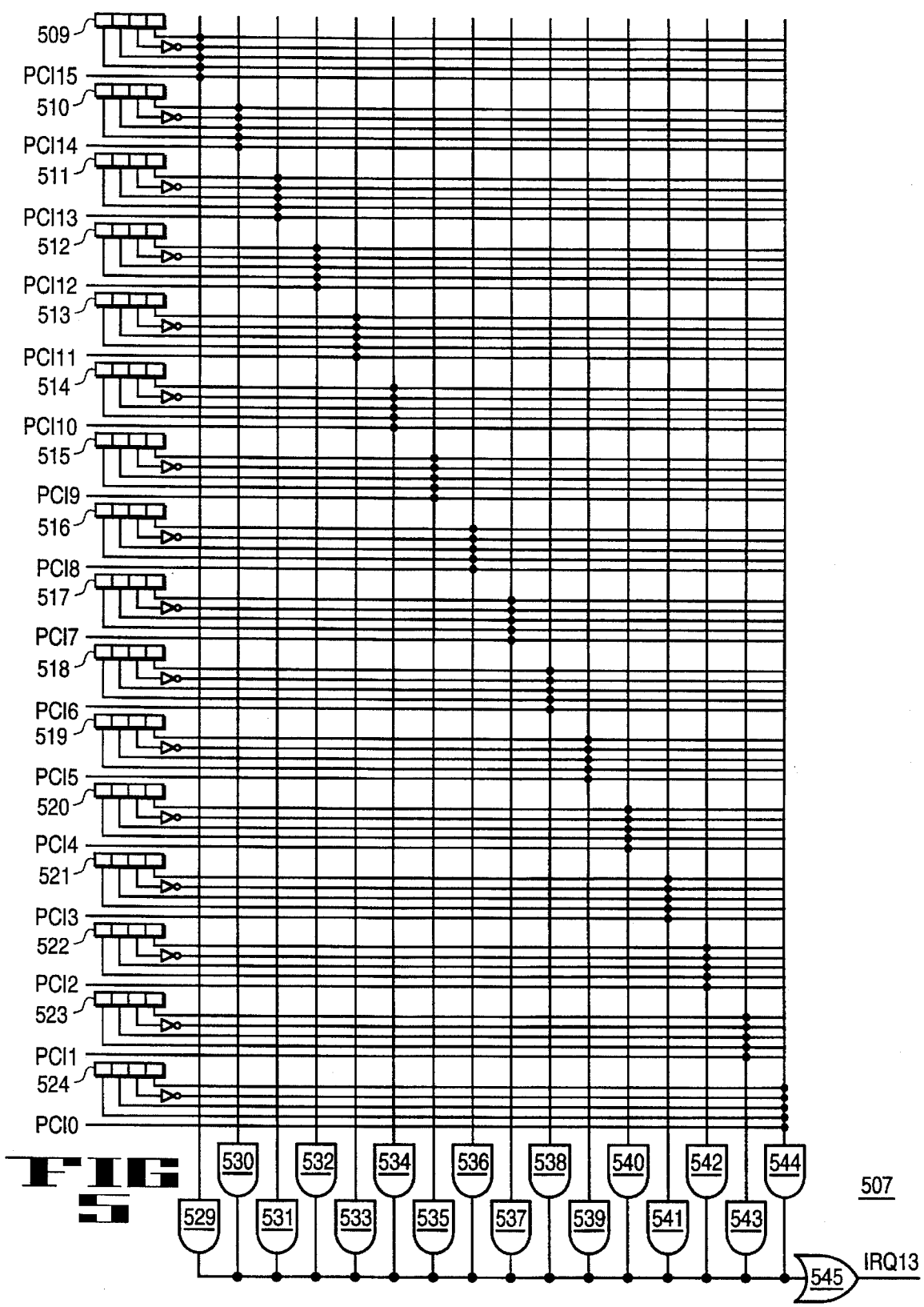

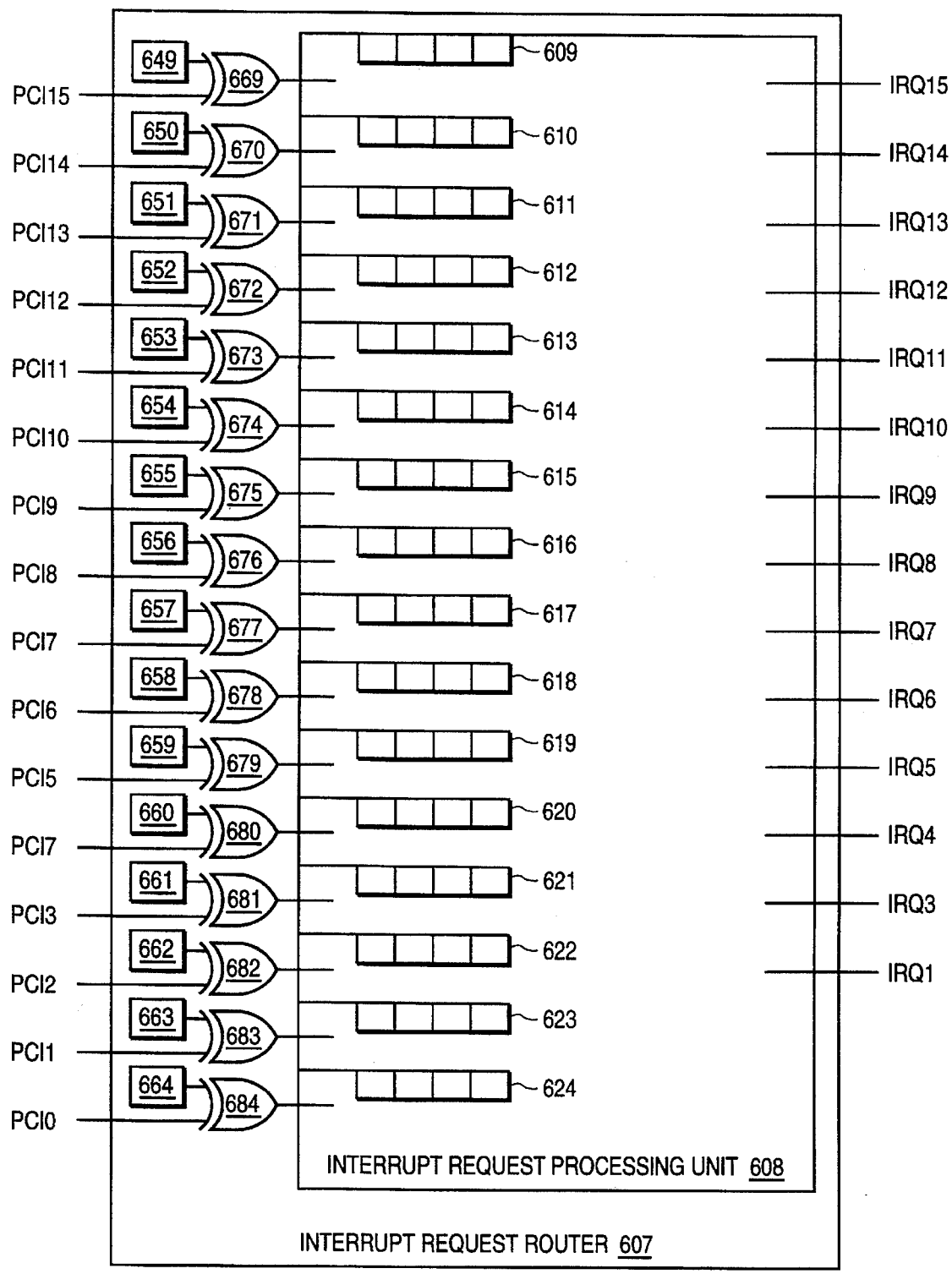
FIG_6

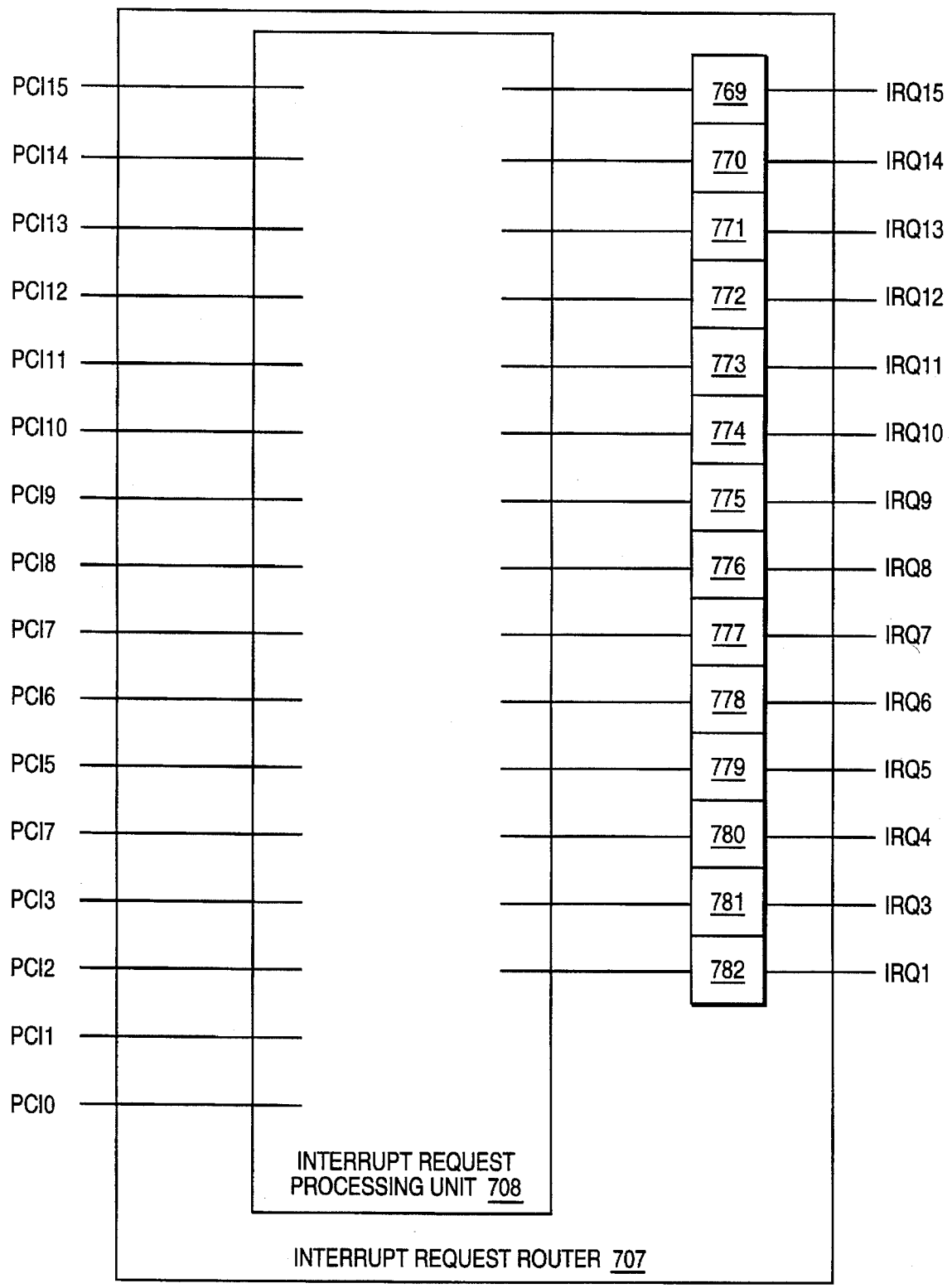
FIG_7

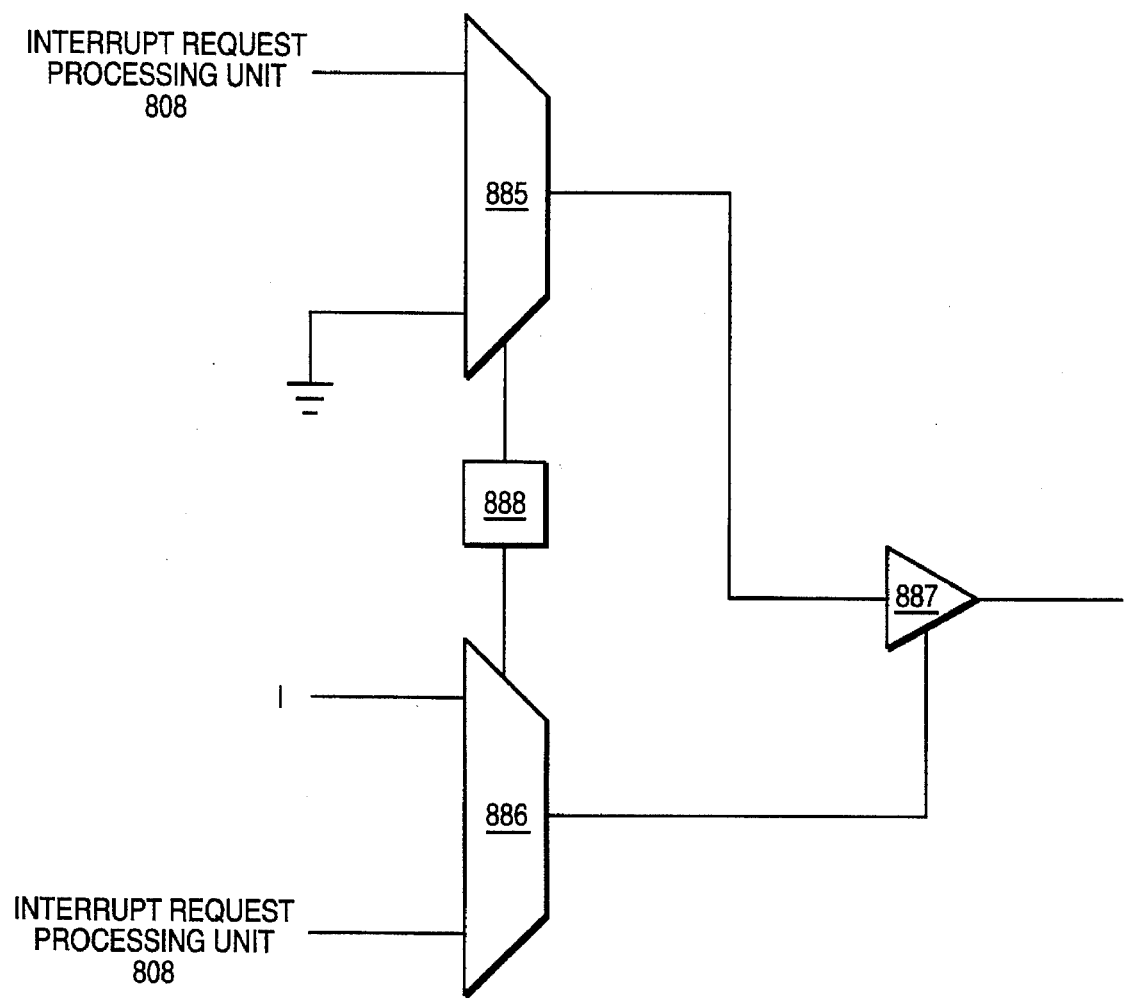
FIG_8

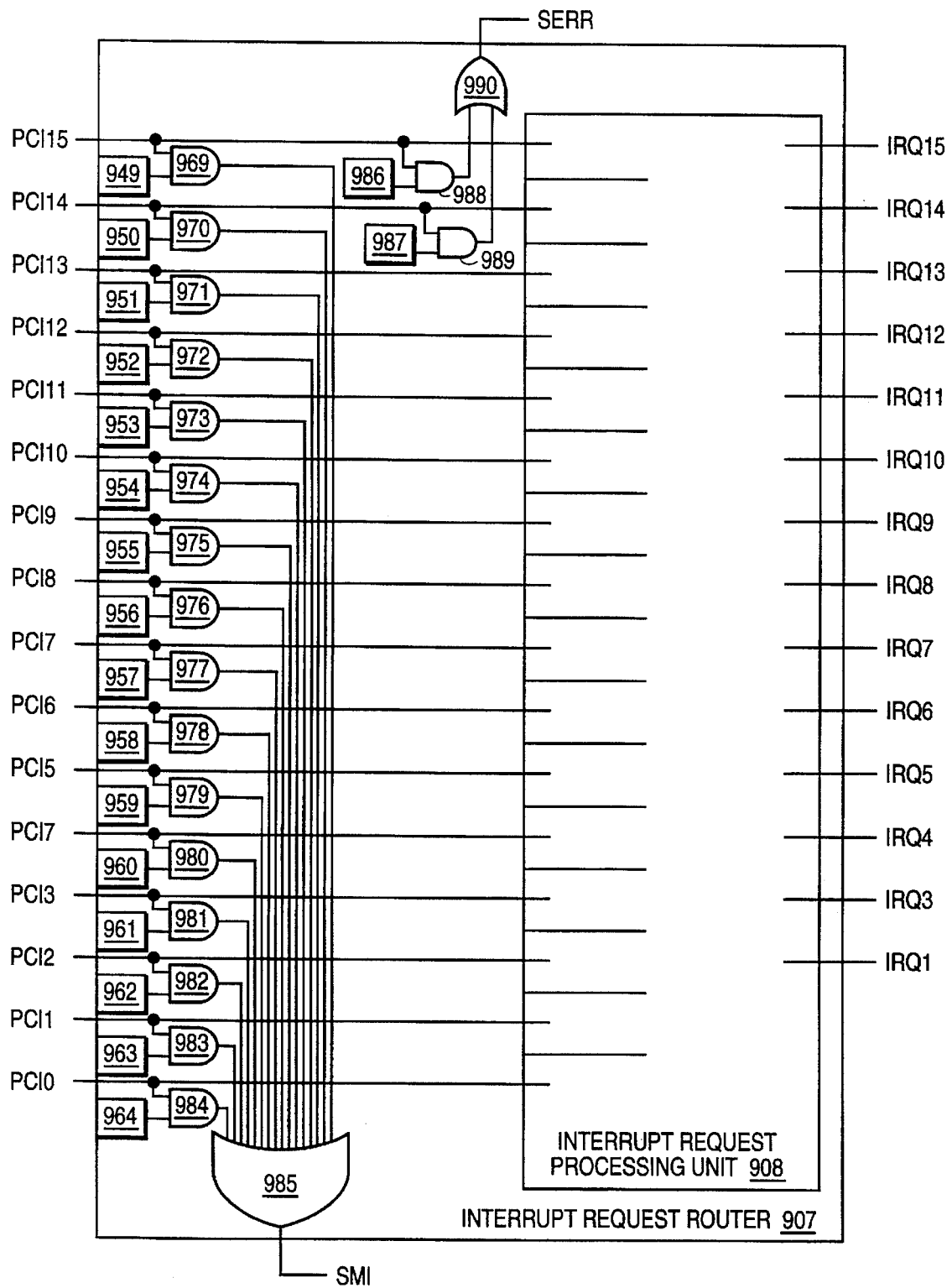
FIG_9

INTERRUPT STEERING FOR A COMPUTER SYSTEM

FIELD OF THE INVENTION

The invention relates to the field of interrupts for computer systems. More particularly, the invention relates to the field of interrupt handling and control in a computer system.

BACKGROUND OF THE INVENTION

One prior computer system, the PC/XT computer system, has an interrupt controller coupled to eight interrupt request lines. The eight interrupt request lines are in turn coupled to peripheral devices or other components. The interrupt controller is also coupled to a microprocessor by a single interrupt signal line. When the interrupt controller receives an interrupt request signal over one of the eight interrupt request lines from a peripheral device or other device, it transmits an interrupt signal to the microprocessor over the single interrupt signal line. Thus, every interrupt request signal regardless of the source results in the transmission of the same interrupt signal to the microprocessor.

A second prior computer system, the PC/AT computer system, has two interrupt controllers. The first interrupt controller is coupled to a microprocessor by a single interrupt line. The first interrupt controller is also coupled to eight interrupt request lines. Seven of the eight interrupt request lines are coupled to peripheral or other components. The eighth interrupt request line is coupled to the second interrupt controller. The second interrupt controller is in turn coupled to another eight interrupt request lines. The eight interrupt request lines are coupled to peripheral or other components. In this manner, a total of fifteen interrupt request lines are provided for use by peripheral or other components.

When the first interrupt controller receives an interrupt request signal over one of the seven interrupt request lines from a peripheral device or other device, it transmits an interrupt signal to the microprocessor over the single interrupt signal line. Thus, every interrupt request signal on any of the seven interrupt request lines regardless of the source results in the transmission of the same interrupt signal to the microprocessor. In addition, when the second interrupt controller receives an interrupt request signal over one of its eight interrupt request lines from a peripheral device or other device, it transmits an interrupt request signal to the first interrupt controller. The first interrupt controller in response to the interrupt request signal from the second interrupt controller transmits an interrupt signal to the microprocessor over the single interrupt signal line. Thus, every interrupt request signal on any of the eight interrupt request lines of the second controller regardless of the source results in the transmission of the same interrupt request signal to the first interrupt controller and the same interrupt signal to the microprocessor.

In the PC/AT computer system, when the microprocessor receives an interrupt signal, it queries the first interrupt controller to determine the source of the interrupt signal. In querying the first interrupt controller, all eight interrupt request lines of the first interrupt controller are polled. If the interrupt signal originated due to an interrupt request signal on the eighth interrupt request line of the first interrupt controller, the microprocessor also queries the second interrupt controller. In querying the second interrupt controller, all eight interrupt request lines of the second interrupt controller are polled. In this manner, the microprocessor can determine which of the fifteen interrupt request lines caused the interrupt signal to the microprocessor and thus, can determine the source of the interrupt signal.

However, the PC/AT computer system is limited to fifteen interrupt request lines. With the expansion of computer systems to incorporate additional functionalities e.g. audio, video and multimedia, additional interrupt handling capacity is required to achieve a requisite level of performance.

Thus, an interrupt request router that provides enhanced interrupt request handling capability is needed.

SUMMARY OF THE INVENTION

A novel interrupt request router is described. The interrupt request router comprises a plurality of interrupt request inputs for receiving a first plurality of interrupt request signals, a plurality of registers for storing configuration values, an interrupt request processing device coupled to the plurality of interrupt request inputs and the plurality of registers for generating an interrupt request signal of a second plurality of interrupt request signals in response to one of the first plurality of interrupt request signals wherein the interrupt request signal of a second plurality of interrupt request signals is determined by the configuration values, and a plurality of interrupt request outputs for transmitting the second plurality of interrupt request signals.

Under an alternative embodiment, the interrupt request router further comprises a polarity register coupled to the interrupt request processing device for storing a polarity configuration value of one of the first plurality of interrupt request signals wherein the polarity configuration value indicates an active signal state of one of the first plurality of interrupt request signals.

Under yet another alternative embodiment, the interrupt request router further comprises an interrupt request mode register coupled to the interrupt request processing device for storing a drive mode configuration value of one of the plurality of interrupt request outputs wherein the drive mode configuration value indicates a drive mode of one of the plurality of interrupt request outputs.

A method for directing interrupt request signals is also described. The method comprises storing a configuration value in a register, receiving an interrupt request signal of a first plurality of interrupt request signals, and generating an interrupt request signal of a second plurality of interrupt request signals wherein the interrupt request signal of a second plurality of interrupt request signals is determined by the configuration value.

Under an alternative embodiment, the method further comprises storing a polarity configuration value wherein the polarity configuration value indicates an active signal state of the interrupt request signal of a first plurality of interrupt request signals.

Under yet another alternative embodiment, the method further comprises storing a drive mode configuration value wherein the drive mode configuration value indicates a drive mode of the interrupt request signal of a second plurality of interrupt request signals.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 illustrates in block diagram form a computer system of one embodiment of the present invention.

FIG. 2 illustrates in block diagram form an interrupt request router of a second embodiment of the present invention.

FIG. 3 illustrates in block diagram form an interrupt controller of FIG. 1.

FIG. 4 illustrates in logic diagram form an interrupt request router of a third embodiment of the present invention.

FIG. 5 illustrates in circuit diagram form an interrupt request router of a fourth embodiment of the present invention.

FIG. 6 illustrates in logic diagram form an interrupt request router of a fifth embodiment of the present invention.

FIG. 7 illustrates in logic diagram form an interrupt request router of a sixth embodiment of the present invention.

FIG. 8 illustrates in block diagram form a drive mode selector of a seventh embodiment of the present invention.

FIG. 9 illustrates in logic diagram form an interrupt request router of a eighth embodiment of the present invention.

DETAILED DESCRIPTION

A novel interrupt request router is described. In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Some portions of the detailed descriptions which follow are presented in terms of algorithms and symbolic representations of operations on data bits within a computer system. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

FIG. 1 illustrates in block diagram form a computer system of one embodiment of the present invention. The computer system comprises bus 100, keyboard interface 101, external memory 102, mass storage device 103, processor 104, display device controller 105, interrupt controller 106 and interrupt request router 107. Bus 100 is coupled to display device controller 105, keyboard interface 101, interrupt controller 106, microprocessor 104, memory 102 and mass storage device 103. Display device controller 105 can be coupled to a display device. Keyboard controller 101 is coupled to interrupt controller 106 and can be coupled to a keyboard. Interrupt controller 106 is coupled to interrupt request router 107.

Bus 100 can be a single bus or a combination of multiple buses. As an example, bus 100 can comprise an Industry Standard Architectural (ISA) bus, an Extended Industry Standard Architecture (EISA) bus, a system bus, a X-bus, PS/2 bus, a Peripheral Components Interconnect (PCI) bus, a Personal Computer Memory Card International Association (PCMCIA) bus or other buses. Bus 100 can also comprise a combination of any buses. Bus 100 provides communication links between components in the computer system. Keyboard interface 101 can be a keyboard controller or other keyboard interface. Keyboard interface 101 can be a dedicated device or can reside in another device such as a bus controller or other controller. Keyboard interface 101 allows coupling of a keyboard to the computer system and transmits signals from a keyboard to the computer system. External memory 102 can comprise a dynamic random access memory (DRAM) device, a static random access memory (SRAM) device, or other memory devices. External memory 102 stores information and data from mass storage device 103 and processor 104 for use by processor 104. Mass storage device 103 can be a hard disk drive, a floppy disk drive, a CD-ROM device, a flash memory device or other mass storage device. Mass storage device 103 provides information and data to external memory 102.

Processor 104 processes information and data from external memory 102 and stores information and data into external memory 102. Processor 104 also receives signals from keyboard controller 101 and transmits information and data to display device controller 105 for display on a display device. Processor 104 can be a complex instruction set computing (CISC) microprocessor, a reduced instruction set computing (RISC) microprocessor, a very long instruction word (VLIW) microprocessor or other processor device. Display device controller 105 allows coupling of a display device to the computer system and acts as an interface between the display device and the computer system. Display device controller 105 can be a monochrome display adapter (MDA) card, a color graphics adapter (CGA) card, enhanced graphics adapter (EGA) card or other display device controller. The display device can be a television set, a computer monitor, a flat panel display or other display device. The display device receives information and data from processor 104 through display device controller 105 and displays the information and data to the user of the computer system.

Interrupt controller 106 receives interrupt request signals from interrupt request router 107, peripheral devices and other components such as keyboard interface 101. In response to an interrupt request signal, interrupt controller 106 transmits an interrupt signal to microprocessor 104. Interrupt controller 106 also indicates the source of the interrupt when interrupt controller 106 receives a query from processor 104. Interrupt controller 106 can be part number 8259 manufactured by Intel Corporation or other interrupt controller. Interrupt request router 107 comprises a register. Interrupt request router 107 stores a configuration value in the register. Interrupt request router 107 also comprises a plurality of interrupt request inputs for receiving a first plurality of interrupt request signals. Interrupt request router 107 also comprises a plurality of interrupt request outputs for transmitting a second plurality of interrupt request signals. The interrupt request outputs are coupled to interrupt controller 106. When interrupt request router 107 receives an interrupt request signal of the first plurality of interrupt request signals through an interrupt request input, interrupt request router 107 can generate an interrupt request signal of the second plurality of interrupt request signals to interrupt controller 106. The interrupt request signal of the second plurality of interrupt request signals is determined by the configuration value stored in the register.

Alternatively, interrupt request router 107 can comprise a plurality of registers, one register for each interrupt request input. In this case, each interrupt request input is individually controllable and interrupt request router 107 can be programmed to generate any interrupt request output signal in response to the interrupt request input or no interrupt request output signal in response to the interrupt request input.

The controllability of each interrupt request input gives interrupt request router 107 the versatility to utilize interrupt request input and interrupt request output combinations that optimize interrupt handling performance for a given system configuration. The programmability of interrupt request router 107 gives interrupt request router 107 the ability to alter interrupt request input and interrupt request output combinations to account for changes in the system configuration or to further optimize interrupt handling performance. In addition, programmability allows interrupt request router 107 the ability to alter interrupt request input and interrupt request output combination during the operation of the computer system.

FIG. 2 illustrates in block diagram form an interrupt request router of a second embodiment of the present invention. Interrupt request router 207 comprises interrupt request processing unit 208, register 209, register 210, register 211, register 212, register 213, register 214, register 215, register 216, register 217, register 218, register 219, register 220, register 221, register 222, register 223 and register 224. In this embodiment, interrupt request router 207 also comprises sixteen interrupt request inputs. Interrupt request router 207 receives a first plurality of interrupt request signals (PCI15, PCI14, PCI13, PCI12, PCI11, PCI10, PCI9, PCI8, PCI7, PCI6, PCI5, PCI4, PCI3, PCI2, PCI1 and PCI0) through the interrupt request inputs. Under an alternative embodiment, the PCI15 signal can be a XXINT1 signal, the PCI14 signal can be a XXINT0 signal, the PCI13 signal can be a SCSI1 signal and the PCI12 signal can be a SCSI0 signal. Interrupt request router 207 also comprises a plurality of interrupt request outputs. Interrupt request router 207 transmits a second plurality of interrupt request signals (IRQ15, IRQ14, IRQ13, IRQ12, IRQ11, IRQ10, IRQ9, IRQ8, IRQ7, IRQ6, IRQ5, IRQ4, IRQ3 and IRQ1) through the interrupt request outputs.

In this embodiment, interrupt request processing unit 208 has multiple registers, one for each interrupt request input. Consequently, each interrupt request input is individually controllable. When interrupt request processing unit 208 receives an interrupt request signal over any of the interrupt request inputs, interrupt request processing unit 208 can generate an interrupt request signal over an interrupt request output. The particular interrupt request output and interrupt request output signal selected is determined by the configuration value stored in the register of the interrupt request input from which interrupt request router 207 received an interrupt request signal. As an example, if interrupt request router 207 receives an interrupt request signal over the interrupt request input labeled as PCI8, interrupt request processing unit 208 determines the configuration value stored in register 216 and generates an interrupt request signal over the interrupt request output labeled as IRQ5 when the configuration value stored in register 216 corresponds to the interrupt request output labeled as IRQ5. On the other hand, when the configuration value corresponds to no interrupt request output, interrupt request router 207 does not generate an interrupt request output signal. By storing the appropriate configuration value in the configuration register associated with a particular interrupt request input, interrupt request processing unit 208 generates the interrupt request output signal specified by the configuration value over the specified interrupt request output or does not generate an interrupt request output signal at all.

A large number of interrupt request input and interrupt request output combinations can be created by storing the appropriate configuration values in the configuration registers. Multiple interrupt request inputs can be linked to a single interrupt request output or a single interrupt request input can be linked to a single interrupt request output. In addition, multiple interrupt request inputs or a single interrupt request input can be linked to no interrupt request output. However, at any given time only one interrupt request output if any will be specified for a given interrupt request input. Moreover, registers 209–224 are accessible by processor 104 and thus, processor 104 can store configuration values into registers 209–224 at boot-up, in response to software instructions or in response to user input. Consequently, the particular interrupt request input and interrupt request output combination utilized by interrupt request processing unit 208 can change during the course the execution of a software program or can change during the course of the operation of the computer system. The interrupt request signals listed as interrupt request inputs in FIG. 2 are interrupt request signals utilized by a PCI computer system. The interrupt request signals listed in FIG. 2 as interrupt request outputs are EISA interrupt request signals. Interrupt request router 207 can be an implementation of interrupt request router 107 of FIG. 1.

In this embodiment, the configuration value used to select IRQ15 is 15 or 1111, the configuration value used to select IRQ14 is 14 or 1110, the configuration value used to select IRQ13 is 13 or 1101, the configuration value used to select IRQ12 is 12 or 1100, the configuration value used to select IRQ11 is 11 or 1011, the configuration used to select IRQ10 is 10 or 1010, the configuration value used to select IRQ9 is 9 or 1001, the configuration value used to select IRQ8 is 8 or 1000, the configuration value used to select IRQ7 is 7 or 0111, the configuration value used to select IRQ6 is 6 or 0110, the configuration value used to select IRQ5 is 5 or 0101, the configuration value used to select IRQ4 is 4 or 0100, the configuration value used to select IRQ3 is 3 or 0011, the configuration value used to select IRQ1 is 1 or 0001 and the configuration value used to select no interrupt request output is 0 or 0000. It will be appreciated that other arrangements using different configuration values can also be used to select the interrupt request signals, IRQ1 and IRQ3–IRQ15.

FIG. 3 illustrates in block diagram form an interrupt controller of FIG. 1. Interrupt controller 106 comprises two programmable interrupt controllers, master interrupt controller 325 and slave interrupt controller 326. Master interrupt controller 325 receives eight interrupt request signals. Seven interrupt request signals originate from peripheral devices or other components (IRQ0, IRQ1, IRQ3, IRQ4, IRQ5, IRQ6 and IRQ7) and one interrupt request signal originate from slave interrupt controller 326 (IRQ2). In response to an interrupt request signal of the eight interrupt request signals (IRQ0–IRQ7), master interrupt controller 325 transmits an interrupt signal to microprocessor 104. Slave interrupt controller 326 also receives eight interrupt request signals IRQ8, IRQ9, IRQ10, IRQ11, IRQ12, IRQ13, IRQ14 and IRQ15). When slave interrupt controller 326 receives an interrupt request signal of any of the eight interrupt request signals (IRQ8–IRQ15), slave interrupt controller 326 transmits an interrupt request signal to master interrupt controller 325 over the IRQ2 signal line. In this manner, 15 interrupt request signal lines are provided to the computer system (IRQ0, IRQ1, IRQ3, IRQ4, IRQ5, IRQ6, IRQ7, IRQ8, IRQ9, IRQ10, IRQ11, IRQ12, IRQ13, IRQ14 and IRQ15).

FIG. 4 illustrates in logic diagram form an interrupt request router of a third embodiment of the present invention. FIG. 4 illustrates the circuitry for one interrupt request output IRQ13. It will be appreciated that the circuitry for other interrupt request outputs, IRQ1, IRQ3, IRQ4, IRQ5, IRQ6, IRQ7, IRQ8, IRQ9, IRQ10, IRQ11, IRQ12, IRQ14 and IRQ15 are analogous to the circuitry illustrated for IRQ13. Interrupt request router 407 comprises register 409, register 410, register 411, register 412, register 413, register 414, register 415, register 416, register 417, register 418, register 419, register 420, register 421, register 422, register 423 and register 424. Interrupt request router 407 also comprises AND gate 429, AND gate 430, AND gate 431, AND gate 432, AND gate 433, AND gate 434, AND gate 435, AND gate 436, AND gate 437, AND gate 438, AND gate 439, AND gate 440, AND gate 441, AND gate 442, AND gate 443, AND gate 444 and OR gate 445. Registers 409–424 are four bit registers. In this embodiment, the configuration value for IRQ13 is 1101 and thus, the second input terminals of AND gate 429–444 have an inversion. Interrupt request router 407 generates an interrupt request signal over interrupt request output IRQ13 when interrupt request router 407 receives an interrupt request signal over any of the interrupt request inputs (PCI0–PCI15) and the register for the corresponding interrupt request input has a configuration value of 1101. In all other situations, interrupt request router 407 does not generate an interrupt request signal over interrupt request output IRQ13. Interrupt request router 407 can be an implementation of interrupt request router 107 and interrupt request router 207 of FIG. 2.

FIG. 5 illustrates in circuit diagram form an interrupt request router of a fourth embodiment of the present invention. FIG. 5 illustrates the circuitry for one interrupt request output IRQ13. Analogous circuitry can be utilized for the other interrupt request outputs, IRQ1, IRQ3–IRQ12, IRQ14 and IRQ15. Interrupt request router 507 comprises register 509, register 510, register 511, register 512, register 513, register 514, register 515, register 516, register 517, register 518, register 519, register 520, register 521, register 522, register 523 and register 524. Interrupt request router 507 also comprises AND gate 529, AND gate 530, AND gate 531, AND gate 532, AND gate 533, AND gate 534, AND gate 535, AND gate 536, AND gate 537, AND gate 538, AND gate 539, AND gate 540, AND gate 541, AND gate 542, AND gate 543, AND gate 544 and OR gate 545. Interrupt request router 507 can be implemented using a programmable logic device, programmable logic array, programmable arrayed logic or other programmable logic devices. Interrupt request router 507 can be an implementation of interrupt request router 107 of FIG. 1 or interrupt request router 207 of FIG. 2.

FIG. 6 illustrates in logic diagram form an interrupt request router of a fifth embodiment of the present invention.

Interrupt request router 607 comprises register 609, register 610, register 611, register 612, register 613, register 614, register 615, register 616, register 617, register 618, register 619, register 620, register 621, register 622, register 623 and register 624. Registers 609–624 are four bit registers and store configuration values for interrupt request inputs PCI15, PCI14, PCI13, PCI12, PCI11, PCI10, PCI9, PCI8, PCI7, PCI6, PCI5, PCI4, PCI3, PCI2, PCI1 and PCI0. Registers 609–624 function in similar manner as registers 209–224 of FIG. 2 and allow interrupt request router 607 to function in similar manner as interrupt request router 207 of FIG. 2. Interrupt request router 607 can be implemented by utilizing the circuitry of FIG. 4 or FIG. 5.

Interrupt request router 607 also comprises register 649, register 650, register 651, register 652, register 653, register 654, register 655, register 656, register 657, register 658, register 659, register 660, register 661, register 662, register 663, register 664, exclusive-OR gate 669, exclusive-OR gate 670, exclusive-OR gate 671, exclusive-OR gate 672, exclusive-OR gate 673, exclusive-OR gate 674, exclusive-OR gate 675, exclusive-OR gate 676, exclusive-OR gate 677, exclusive-OR gate 678, exclusive-OR gate 679, exclusive-OR gate 680, exclusive-OR gate 681, exclusive-OR gate 682, exclusive-OR gate 683 and exclusive-OR gate 684. Registers 649–664 are each associated with an interrupt request input and each store a polarity configuration value associated with the particular interrupt request input. The polarity configuration value can be a 1 or a 0. When the polarity configuration value for a particular interrupt request input is a 0, interrupt request router 607 generates the interrupt request output signal specified by the four bit configuration value when the interrupt request signal on the particular interrupt request input is in the logical-one state. Interrupt request router 607 does not generates an interrupt request output signal when the interrupt request signal on the particular interrupt request input is in the logical-zero state. Thus, the active state for the particular interrupt request input is the logical-one state.

On the other hand, when the polarity configuration value for a particular interrupt request input is a 1, interrupt request router 607 generates the interrupt request output signal specified by the four bit configuration value when the interrupt request signal on the particular interrupt request input is in the logical-zero state. Interrupt request router 607 does not generates an interrupt request output signal when the interrupt request signal on the particular interrupt request input is in the logical-one state. Thus, the active state for the particular interrupt request input is the logical-zero state. In this manner, interrupt request router 607 can be compatible with components of different polarity configurations.

In this embodiment, interrupt request router 607 comprises one polarity register for each interrupt request input and consequently, each interrupt request input is individually controllable with respect to polarity. A large number of interrupt request input and polarity combinations can be created by storing the appropriate polarity configuration values into polarity registers 649–664. Alternatively, multiple interrupt request inputs can be coupled to a single polarity register. In this case, the interrupt request inputs are no longer individually controllable. The single polarity register controls all interrupt request inputs associated with it. A change to the polarity register causes a change to the polarity of all interrupt request inputs coupled to it.

In addition, registers 649–664 are accessible by processor 104 and thus, processor 104 can store polarity configuration values into registers 649–664 at boot-up, in response to software instructions or in response to user input.

Consequently, the particular interrupt request input and polarity combination utilized by interrupt request router 607 can change during the course the execution of a software program or can change during the course of the operation of the computer system.

Interrupt request router 607 can be an implementation of interrupt request router 107 of FIG. 1 or interrupt request router 207 of FIG. 2.

FIG. 7 illustrates in block diagram form an interrupt request router of a sixth embodiment of the present invention. Interrupt request router 707 comprises drive mode selector 769, drive mode selector 770, drive mode selector 771, drive mode selector 772, drive mode selector 773, drive mode selector 774, drive mode selector 775, drive mode selector 776, drive mode selector 777, drive mode selector 778, drive mode selector 779, drive mode selector 780, drive mode selector 781 and drive mode selector 782. Drive mode selectors 769–782 are coupled to interrupt request outputs, IRQ15–IRQ3 and IRQ1 respectively. Drive mode selectors 769–782 selects the drive mode of interrupt request output signals, IRQ15–IRQ3 and IRQ1 respectively. Because interrupt request router 707 comprises one drive mode selector for each interrupt request output, each interrupt request output is individually controllable with respect to drive mode. The drive mode selectors also allow interrupt request router 707 and components coupled to the interrupt request inputs to be compatible with a variety of components with different drive modes.

One drive mode can be driving a first potential (e.g. 5 or 3.3 volts) on a corresponding interrupt request output to assert an interrupt request output signal and driving a second potential (e.g. ground potential) on a corresponding interrupt request output to deassert an interrupt request output signal. This drive mode can be referred to as edge mode. With edge mode, components coupled to interrupt request router 707 receiving the interrupt request output signal respond to the edge portions of the interrupt request output signal. A second drive mode can be driving a first potential (e.g. ground potential) on a corresponding interrupt request output to assert an interrupt request output signal and floating the corresponding interrupt request output to deassert an interrupt request output signal. This drive mode can be referred to as level mode. With level mode, components coupled to interrupt request router 707 receiving the interrupt request output signal respond to the level portions of the interrupt request output signal. In other embodiments, other drive modes can be selected. As an example, one drive mode can be floating a corresponding interrupt request output to assert an interrupt request output signal and driving a first potential on a corresponding interrupt request output to deassert an interrupt request output signal.

When interrupt request router 707 receives an interrupt request signal over any of the interrupt request inputs, interrupt request router 707 generates an interrupt request signal over an interrupt request output in the drive mode selected by the corresponding drive mode selector. The particular interrupt request output and interrupt request output signal selected is determined by the configuration value stored in the register of the interrupt request input from which interrupt request router 707 received an interrupt request signal. A disable value (e.g. 0000) can be stored in the register. In this case, interrupt request router 707 does not generate an interrupt request output signal over the particular interrupt request output in response to the interrupt request signal over the interrupt request input.

Interrupt request router 707 can be an implementation of interrupt request router 107 of FIG. 1 or interrupt request router 207 of FIG. 2.

FIG. 8 illustrates in block diagram form a drive mode selector of a seventh embodiment of the present invention. Drive mode selector 869 comprises multiplexor 885, multiplexor 886, tristate buffer 887 and register 888. The first input terminal of multiplexor 885 is coupled to interrupt processing device 808 and the second input terminal of multiplexor 885 is coupled to a first voltage potential (e.g. ground potential). The select terminal of multiplexor 885 is coupled to register 888. The first input terminal of multiplexor 886 is coupled to a second voltage potential (e.g. 5 volts or 3.3 volts) and the second input terminal of multiplexor 886 is coupled to interrupt processing device 808. The select terminal of multiplexor 886 is coupled to register 888. The output terminal of multiplexor 885 is coupled to the input terminal of tristate buffer 887 and the output terminal of multiplexor 886 is coupled to the enable terminal of tristate buffer 887. The output terminal of tristate buffer 887 is coupled to an interrupt request output.

Register 888 stores a drive mode configuration value for the interrupt request output. When the drive mode configuration value is a logical-one, multiplexor 885 selects the first input terminal and multiplexor 886 also selects the first input terminal. The selection of the first input terminal by multiplexor 886 causes tristate buffer 887 to be enabled. When multiplexor 885 receives a signal of a first signal state (e.g. a logical-zero), the signal of the first signal state is transmitted to tristate buffer 887 and tristate buffer 887 transmits the signal of the first signal state over the interrupt request output. When multiplexor 885 receives a signal of a second signal state (e.g. a logical-one), the signal of the second signal state is transmitted to tristate buffer 887 and tristate buffer 887 transmits the signal of the first signal state over the interrupt request output. The drive mode described is the edge mode.

On the other hand, when the drive mode configuration value is a logical-zero, multiplexor 885 selects the second input terminal and multiplexor 886 also selects the second input terminal. The selection of the second input terminal by multiplexor 886 causes tristate buffer 887 to be disabled when multiplexor 886 receives a signal of a first signal state (e.g. a logical-zero) from interrupt processing device 808 and tristate buffer 887 to be enabled when multiplexor 886 receives a signal of a second signal state (e.g. a logical-one) from interrupt processing device 808. When tristate buffer 887 is enabled, the signal of the first signal state is transmitted from multiplexor 885 to the input of tristate buffer 887 and tristate buffer 887 transmits the signal of the first signal state over the interrupt request output. Thus, when interrupt processing unit 808 transmits a signal of a first signal state, tristate buffer 887 floats its output terminal and when interrupt processing unit 808 transmits a signal of a second signal state, tristate buffer 887 transmits a signal of a first signal state. The drive mode described is the level mode.

Under an alternative embodiment, drive mode selector 869 further comprises an AND gate. The AND gate is positioned between multiplexor 885 and interrupt request processing unit 808. The first input terminal of the AND gate is coupled to interrupt request processing unit 808. The inversion of the second input terminal is coupled to the interrupt acknowledge signal line. The output terminal of the AND gate is coupled to the first input terminal of multiplexor 885. The interrupt acknowledge signal is asserted upon the completion of an interrupt service routine. When the interrupt acknowledge signal is asserted, the AND gate transmits an output signal of a first signal state (e.g. a logical-zero) to multiplexor 885. Multiplexor 885 in turn transmits an output signal of a first signal state to tristate buffer 887 which also transmits an output signal of a first signal state to the interrupt request output. In this manner, an edge is created in the interrupt request output signal.

The edge is necessary because a component that receives the interrupt request output signal may be edge sensitive. An edge sensitive component requires an edge to detect a signal state. When interrupt processing unit 808 receives an interrupt request input signal, interrupt processing unit 808 can assert a signal to the AND gate. Interrupt processing unit 808 keeps the signal line to the AND gate asserted while the interrupt request is being serviced. If a second interrupt request input signal arrives before completion of interrupt request servicing operation and results in the same interrupt request output signal, interrupt processing unit 808 keeps the signal line to the AND gate asserted even after completion of the first interrupt request servicing because of the second interrupt request. An edge sensitive component would not be able to detect the second interrupt request output signal. To enable detection, the interrupt acknowledge signal is asserted after completion of the first interrupt request servicing in order to provide an edge.

In addition, register 888 is accessible by processor 104 and thus, processor 104 can store drive mode configuration values into register 888 at boot-up, in response to software instructions or in response to user input. Consequently, the particular drive mode utilized by interrupt request router 807 can change during the course the execution of a software program or can change during the course of the operation of the computer system.

Drive mode selector 869 can be an implementation of drive mode selector 769, drive mode selector 770, drive mode selector 771, drive mode selector 772, drive mode selector 773, drive mode selector 774, drive mode selector 775, drive mode selector 776, drive mode selector 777, drive mode selector 778, drive mode selector 779, drive mode selector 780, drive mode selector 781 or drive mode selector 782 of FIG. 7.

FIG. 9 illustrates in logic diagram form an interrupt request router of a eighth embodiment of the present invention. Interrupt request router 907 comprises interrupt processing unit 908. Interrupt processing unit 908 functions in a manner similar to interrupt processing unit 208 of FIG. 2. Interrupt processing unit 908 can be implemented by utilizing the circuitry of FIG. 4 or FIG. 5.

Interrupt request router 907 also comprises register 949, register 950, register 951, register 952, register 953, register 954, register 955, register 956, register 957, register 958, register 959, register 960, register 961, register 962, register 963, register 964, AND gate 969, AND gate 970, AND gate 971, AND gate 972, AND gate 973, AND gate 974, AND gate 975, AND gate 976, AND gate 977, AND gate 978, AND gate 979, AND gate 980, AND gate 981, AND gate 982, AND gate 983, AND gate 984 and OR gate 985. Registers 949–964 are each associated with an interrupt request input and each store a system management interrupt (SMI) configuration value associated with the particular interrupt request input. The SMI configuration value can be a 1 or a 0. When the SMI configuration value for a particular interrupt request input is a 1, interrupt request router 907 generates a SMI signal when interrupt request router 907 receives the particular interrupt request input signal. On the other hand, when the SMI configuration value for a particular interrupt request input is a 0, interrupt request router 907 does not generate the SMI signal in response to the particular interrupt request input signal.

In this embodiment, interrupt request router 907 comprises one SMI register for each interrupt request input and consequently, each interrupt request input is individually controllable with respect to SMI signal generation. A large number of interrupt request input and SMI configuration combinations can be created by storing the appropriate SMI configuration values into registers 949–964. Alternatively, multiple interrupt request inputs can be coupled to a single SMI register. In this case, the interrupt request inputs are no longer individually controllable. The single SMI register controls all interrupt request inputs associated with it. A change to the SMI register causes a change to the SMI generating characteristics of all interrupt request inputs coupled to it.

In addition, registers 949–964 are accessible by processor 104 and thus, processor 104 can store SMI configuration values into registers 949–964 at boot-up, in response to software instructions or in response to user input. Consequently, the particular interrupt request input and SMI configuration combination utilized by interrupt request router 907 can change during the course the execution of a software program or can change during the course of the operation of the computer system.

Under an alternative embodiment, the SMI signal is a server management interrupt signal instead of a system management interrupt signal.

Under another alternative embodiment, interrupt request router 907 also comprises register 986, register 987, AND gate 988, AND gate 989 and OR gate 990. Register 986 and register 987 are each associated with an interrupt request input, PCI15 and PCI14 respectively, and each store a system error (SERR) configuration value associated with the particular interrupt request input. The SERR configuration value can be a 1 or a 0. When the SERR configuration value for a particular interrupt request input is a 1, interrupt request router 907 generates a SERR signal when interrupt request router 907 receives the particular interrupt request input signal. On the other hand, when the SERR configuration value for a particular interrupt request input is a 0, interrupt request router 907 does not generate the SERR signal in response to the particular interrupt request input signal.

In this embodiment, interrupt request router 907 comprises one SERR register for interrupt request input PCI15 and PCI14 and consequently, both PCI15 and PCI14 are individually controllable with respect to SERR signal generation. A number of interrupt request input and SERR configuration combinations can be created by storing the appropriate SERR configuration values into register 986 and register 987. Alternatively, multiple interrupt request inputs can be coupled to a single SERR register. In this case, the interrupt request inputs are no longer individually controllable. The single SERR register controls all interrupt request inputs associated with it. A change to the SERR register causes a change to the SERR generating characteristics of all interrupt request inputs coupled to it.

In addition, register 986 and register 987 are accessible by processor 104 and thus, processor 104 can store SERR configuration values into register 986 and register 987 at boot-up, in response to software instructions or in response to user input. Consequently, the particular interrupt request input and SERR configuration combination utilized by interrupt request router 907 can change during the course the execution of a software program or can change during the course of the operation of the computer system.

Interrupt request router 907 can be an implementation of interrupt request router 107 of FIG. 1 or interrupt request router 207 of FIG. 2.

In the foregoing description, the invention is described with reference to specific exemplary embodiments thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

Thus, a method and apparatus for directing interrupt request signal has been described.

What is claimed is:

1. An interrupt request router comprising:
   a plurality of interrupt request inputs adapted to receive a first plurality of interrupt request signals;
   a plurality of registers adapted to contain configuration values;
   an interrupt request processing device coupled to said plurality of interrupt request inputs and said plurality of registers, said interrupt request processing device generates an interrupt request signal of a second plurality of interrupt request signals in response to one of said first plurality of interrupt request signals and based on said configuration values;
   a plurality of interrupt request outputs adapted to transmit said second plurality of interrupt request signals; and
   an interrupt request mode register coupled to said interrupt request processing device, said interrupt request mode register is configured to contain a drive mode configuration value of one of said plurality of interrupt request outputs, said drive mode configuration value including a drive level mode value which results in driving a potential on one of said plurality of interrupt request outputs to assert an interrupt request output signal, and alternatively in floating the one of said plurality of interrupt request outputs to deassert the interrupt request output signal.

2. The interrupt request router of claim 1 wherein said first plurality of interrupt request signals comprises sixteen interrupt request signals and wherein said second plurality of interrupt request signals comprises fourteen interrupt request signals.

3. The interrupt request router of claim 1 further comprising:
   a polarity register coupled to said interrupt request processing device for storing a polarity configuration value of one of said first plurality of interrupt request signals wherein said polarity configuration value indicates an active signal state of one of said first plurality of interrupt request signals.

4. The interrupt request router of claim 1 wherein said drive mode configuration value further includes a drive edge mode.

5. The interrupt request router of claim 1, wherein the potential is a ground potential.

6. The interrupt request router of claim 2 wherein said plurality of registers comprises sixteen registers for storing sixteen configuration values.

7. The interrupt request router of claim 3 wherein said interrupt request processing device generates said interrupt request signal of a second plurality of interrupt request signals in response when said interrupt request processing device receives one of said first plurality of interrupt request signals in said active signal state.

8. The interrupt request router of claim 6 wherein each of said configuration values indicate one of said fourteen interrupt request signals.

9. A computer system comprising:
   memory;
   a microprocessor coupled to said memory, said microprocessor processing data contained in said memory; and
   an interrupt request router coupled to said microprocessor, said interrupt request router directs interrupt request signals to said microprocessor and comprises:
   a plurality of interrupt request inputs adapted to receive a first plurality of interrupt request signals,
   a plurality of registers adapted to contain configuration values;
   an interrupt request processing device coupled to said plurality of interrupt request inputs and said plurality of registers adapted to generate an interrupt request signal of a second plurality of interrupt request signals in response to one of said first plurality of interrupt request signals wherein said interrupt request signal of a second plurality of interrupt request signals is determined by said configuration values,
   a plurality of interrupt request outputs adapted to transmit said second plurality of interrupt request signals, and
   an interrupt request mode register coupled to said interrupt request processing device, said interrupt request mode register contains a drive mode configuration value of one of said plurality of interrupt request outputs, said drive mode configuration value indicates a drive mode of one of said plurality of interrupt request outputs, said drive mode configuration value including a value representing a level-mode.

10. The interrupt request router of claim 9 further comprising:
    a polarity register coupled to said interrupt request processing device for storing a polarity configuration value of one of said first plurality of interrupt request signals wherein said polarity configuration value indicates an active signal state of one of said first plurality of interrupt request signals.

11. The interrupt request router of claim 10 wherein said interrupt request processing device generates said interrupt request signal of a second plurality of interrupt request signals in response when said interrupt request processing device receives one of said first plurality of interrupt request signals in said active signal state.

12. A method for directing interrupt request signals comprising:
    storing a configuration value in a register;
    receiving an interrupt request signal of a first plurality of interrupt request signals; and
    generating a level mode interrupt request signal of a second plurality of interrupt request signals wherein said interrupt request signal of a second plurality of interrupt request signals is determined by said configuration value.

13. The method of claim 12 further comprising:
    storing a polarity configuration value wherein said polarity configuration value indicates an active signal state of said interrupt request signal of a first plurality of interrupt request signals.

14. The method of claim 12 further comprising:

storing a drive mode configuration value wherein said drive mode configuration value indicates a drive mode of said interrupt request signal of a second plurality of interrupt request signals.

15. The method of claim 13 wherein said interrupt request signal of a second plurality of interrupt request signals is generated when said interrupt request signal of a first plurality of interrupt request signals is in said active signal state.

16. The method of claim 14 wherein said interrupt request signal of a second plurality of interrupt request signals is generated in said drive mode.

17. An interrupt request router for generating interrupt request signals comprising:

means for storing a configuration value in a register;

means for receiving an interrupt request signal of a first plurality of interrupt request signals; and means for generating an interrupt request signal of a second plurality of interrupt request signals coupled to said means for storing and coupled to said means for receiving wherein said interrupt request signal of a second plurality of interrupt request signals is determined by said configuration value and wherein at a particular configuration value, said means for generating an interrupt request signal generates a level mode interrupt request signal.

18. The interrupt request router of claim 17 further comprising:

means for storing a polarity configuration value coupled to said means for generating an interrupt request signal wherein said polarity configuration value indicates an active signal state of said interrupt request signal of a first plurality of interrupt request signals.

19. The interrupt request router of claim 17 further comprising:

means for storing a drive mode configuration value coupled to said means for generating an interrupt request signal wherein said drive mode configuration value indicates a drive mode of said interrupt request signal of a second plurality of interrupt request signals.

* * * * *